United States Patent
Tomita

(10) Patent No.: US 11,276,390 B2
(45) Date of Patent: Mar. 15, 2022

(54) AUDIO INTERVAL DETECTION APPARATUS, METHOD, AND RECORDING MEDIUM TO ELIMINATE A SPECIFIED INTERVAL THAT DOES NOT REPRESENT SPEECH BASED ON A DIVIDED PHONEME

(71) Applicant: CASIO COMPUTER CO., LTD., Tokyo (JP)

(72) Inventor: Hiroki Tomita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 324 days.

(21) Appl. No.: 16/352,787

(22) Filed: Mar. 13, 2019

(65) Prior Publication Data
US 2019/0295529 A1    Sep. 26, 2019

(30) Foreign Application Priority Data

Mar. 22, 2018 (JP) .............................. JP2018-053927
Feb. 15, 2019 (JP) .............................. JP2019-025686

(51) Int. Cl.
| | |
|---|---|
| *G10L 15/10* | (2006.01) |
| *G10L 15/16* | (2006.01) |
| *G10L 15/187* | (2013.01) |
| *G10L 15/04* | (2013.01) |
| *G10L 15/02* | (2006.01) |
| *G10L 15/14* | (2006.01) |

(52) U.S. Cl.
CPC ............ *G10L 15/02* (2013.01); *G10L 15/187* (2013.01); *G10L 15/142* (2013.01); *G10L 2015/025* (2013.01)

(58) Field of Classification Search
CPC ....... G10L 15/10; G10L 15/16; G10L 15/187; G10L 15/04

USPC ........................................... 704/254, 231, 10
See application file for complete search history.

(56) References Cited

U.S. PATENT DOCUMENTS 4,991,216 A * 2/1991 Fujii ...................... G10L 15/10
                                                              704/254
5,377,302 A * 12/1994 Tsiang ................... G10L 15/16
                                                              704/231

(Continued)

FOREIGN PATENT DOCUMENTS

| JP | 2018005122 A | 1/2018 |
|---|---|---|
| WO | 2016143125 A1 | 9/2016 |

OTHER PUBLICATIONS

Xiao-Lei Zhang, et al., "Deep Belief Networks Based Voice Activity Detection," IEEE Transactions on Audio, Speech, and Language Processing, vol. 21, No. 4, Apr. 2013, pp. 697-710.

(Continued)

*Primary Examiner* — Farzad Kazeminezhad
(74) *Attorney, Agent, or Firm* — Holtz, Holtz & Volek PC

(57) ABSTRACT

An audio interval detection apparatus has a processor and a storage storing instructions that, when executed by the processor, control the processor to: detect, from a target audio signal, a specified audio interval including a specified audio signal representing a state of a phoneme of a same consonant produced continuously over a period longer than a specified time, and, by eliminating, from the target audio signal at least the detected specified audio interval, detect from the target audio signal an utterance audio interval that includes a speech utterance signal representing a speech utterance uttered by a speaker.

18 Claims, 9 Drawing Sheets

(56) References Cited

U.S. PATENT DOCUMENTS

2002/0111802 A1* 8/2002 Ikeda .................. G10L 15/04
704/231
2011/0119052 A1* 5/2011 Onodera ............. G10L 15/187
704/10

OTHER PUBLICATIONS

Yuya Fujita, et al., "Robust DNN-based VAD augmented with phone entropy based rejection of background speech," IPSJ SIG Technical Report, Spoken Language Processing (SLP), vol. 2016-SLP-112, No. 9, Jul. 29, 2016, pp. 1-6.

Yasunar Obuchi, et al., "Voice activity detection under noisy environment based on augmented execution of statistical noise suppression," IPSJ SIG Technical Report, vol. 2012-SLP-94, No. 18, Dec. 21, 2012, pp. 1-6.

* cited by examiner

AUDIO INTERVAL DETECTION APPARATUS, METHOD, AND RECORDING MEDIUM TO ELIMINATE A SPECIFIED INTERVAL THAT DOES NOT REPRESENT SPEECH BASED ON A DIVIDED PHONEME

CROSS-REFERENCE TO RELATED APPLICATION

This application claims the benefit of Japanese Patent Application No. 2018-053927, filed on Mar. 22, 2018, and Japanese Patent Application No. 2019-025686, filed on Feb. 15, 2019, the entire disclosure of which is incorporated by reference herein.

FIELD

The present disclosure relates to an audio interval detection apparatus, a method, and a recording medium.

BACKGROUND

Technology is known that detects, from an audio signal, an utterance audio interval that includes a speech utterance signal representing a speech utterance uttered by a speaker.

For example, Zhang, X.-L., Wu, J., "Deep Belief Networks Based Voice Activity Detection", IEEE Transactions on Audio, Speech, and Language Processing, Vol. 21, No. 4, pp. 697-710, (2013) describes a method detecting the utterance audio interval from an audio signal by using a deep belief network (DBN).

When the utterance audio interval is detected from the audio signal using the method described in the aforementioned reference, sometimes erroneous detection of the utterance audio interval occurs in which an interval in the audio signal that does not include the speech utterance signal, while including a noise audio signal representing noise audio produced by a sound source other than the speaker, is erroneously detected as the utterance audio interval.

The following problems occur due to erroneous detection of the utterance audio interval. For example, when detecting only a portion in which a person is talking from an audio data recorded over a long time period and reproducing only the detected portion is desired, erroneous detection of the utterance audio interval causes reproduction of even unnecessary audio data. Moreover, when voice recognition of speech utterance is performed in real time while recording (inputting) audio, for example, due to erroneous detection of the utterance audio interval, the voice recognition is performed even when no speech utterance is uttered, and resources (amount of computation) are unnecessarily consumed.

Moreover, the following problems occur when detection accuracy of the utterance audio interval is low. For example, when the detected portion includes only noise or environmental sound while not including any speech utterance, time is wasted re-listening to the detected portion of audio data. Moreover, when a portion in which a speech utterance is uttered is not detected and is not included in a result of the detection, for example, audio data requiring re-listening may thus be missed. Furthermore, due to low detection accuracy of the utterance audio interval, a start point of the utterance audio interval or a portion of the utterance interval may not be detected and may not be included in the detection results, and when voice recognition is performed in such a case using the audio data of the detection result as input data, recognition accuracy may decline. Thus improvement of the detection accuracy of the utterance audio interval is desired.

SUMMARY

According to one aspect of the present disclosure, an audio interval detection apparatus comprises a processor and a storage storing instructions that, when executed by the processor, control the processor to:

detect from a target audio signal a specified audio interval including a specified audio signal representing a state of a phoneme of a same consonant produced continuously over a period longer than a specified time, and by eliminating, from the target audio signal at least the detected specified audio interval, detect from the target audio signal an utterance audio interval that includes a speech utterance signal representing a speech utterance uttered by a speaker According to another aspect of the present disclosure, a method executed by an audio interval detection apparatus, the audio interval detection apparatus comprising:
a processor; and
a storage storing instructions executed by the processor, wherein the method comprises:

detecting from a target audio signal a specified audio interval including a specified audio signal representing a state of a phoneme of a same consonant produced continuously over a period longer than a specified time, and by eliminating, from the target audio signal at least the detected specified audio interval, detecting from the target audio signal an utterance audio interval that includes a speech utterance signal representing a speech utterance uttered by a speaker.

According to yet another aspect of the present disclosure, a non-transitory recording medium having a program recorded thereon that is executable to control a processor of an audio interval detection apparatus comprising the processor and a storage storing instructions executed by the processor, the program, when executed by the processor, controls the processor to:

detect from a target audio signal a specified audio interval including a specified audio signal representing a state of a phoneme of a same consonant produced continuously over a period longer than a specified time, and by eliminating from the target audio signal at least the detected specified audio interval, detect from the target audio signal an utterance audio interval that includes a speech utterance signal representing a speech utterance uttered by a speaker.

BRIEF DESCRIPTION OF THE DRAWINGS

The components in the drawings are not necessarily to scale relative to each other. A more complete understanding of this application can be obtained when the following detailed description is considered in conjunction with the following drawings, in which.

DETAILED DESCRIPTION

Figure 1:
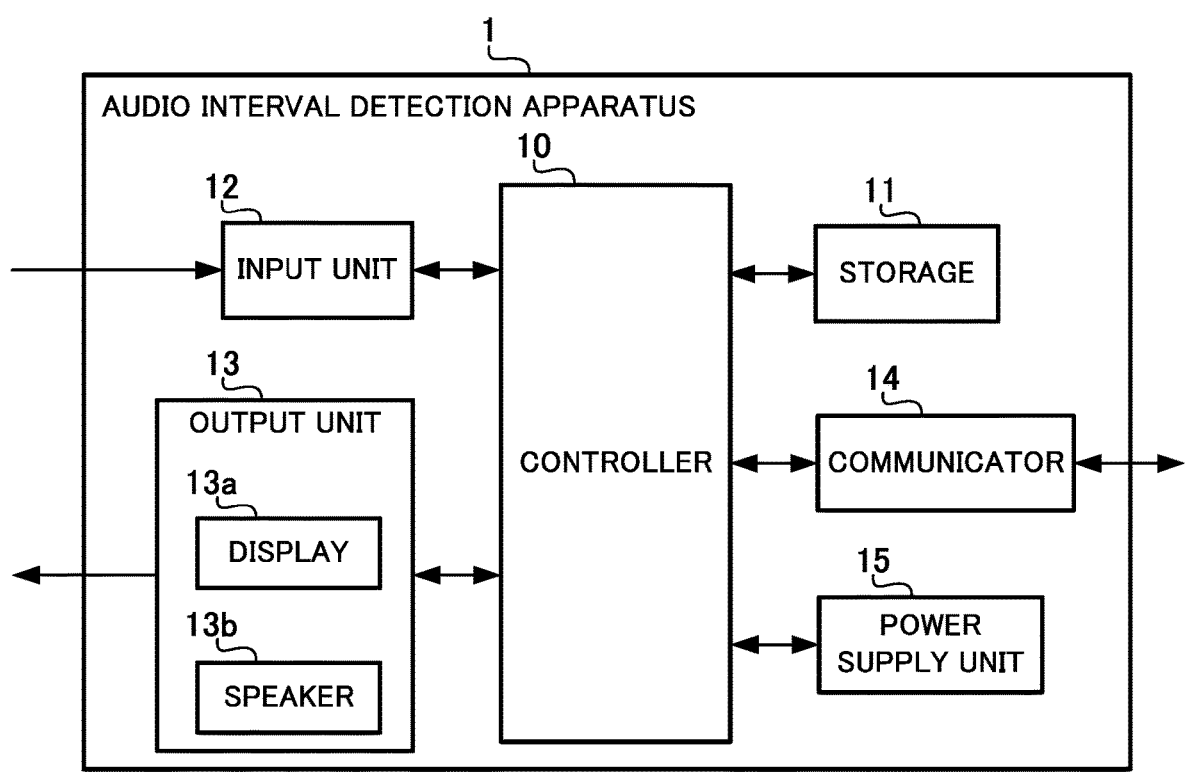
FIG. 1 illustrates physical configuration of an audio interval detection apparatus according to an embodiment of the present disclosure.

An audio interval detection apparatus according to an embodiment of the present disclosure is described below with reference to drawings. In the drawings, components that are the same or equivalent are assigned with the same reference sign.

An audio interval detection apparatus 1 illustrated in FIG. 1 detects, from a target audio signal, an utterance audio interval included in a speech utterance signal that represents speech utterance uttered by a speaker. Specific examples of the target audio signal include an audio signal representing audio of a conference, an audio signal representing audio of a speech, an audio signal representing audio of a television broadcast, an audio signal representing audio of a radio broadcast, or the like.

The audio interval detection apparatus 1 comprises a controller 10, a storage 11, an input unit 12, an output unit 13, a communicator 14, and a power supply unit 15.

The controller 10 comprises a central processing unit (CPU) and executes various types of processing including a below-described audio interval detection processing in accordance with programs and data stored in the storage 11. The controller 10 is connected to various components of the audio interval detection apparatus 1 via a non-illustrated system bus that is a transmission route for commands and data, and performs overall control of the audio interval detection apparatus 1.

The storage 11 comprises a read only memory (ROM), a random access memory (RAM), and a non-volatile external storage device such as a hard disk drive (HDD), a flash memory, or the like, and in addition to storing programs and data used by the controller 10 for executing various types of processing, stores data generated or acquired by the controller 10 by executing various types of processing. Specifically, the storage 11 stores a control program executed by the controller 10. Moreover, the storage 11 stores target audio data representing a target audio signal. The audio interval detection apparatus 1 acquires from an external information processing apparatus, such as a personal computer (PC), a smart phone, or the like, target audio data generated by the information processing apparatus by recording the target audio signal, and stores the target audio data in the external storage device included in the storage 11.

The RAM included in the storage 11 functions as a work area of the controller 10. That is to say, the controller 10 reads and writes to the RAM the programs and data stored in the storage 11, and executes various types of processing by referring to the read-out programs and data.

The input unit 12 comprises an input device such as a keyboard, a touch panel, an operating button, or the like, receives various types of instructions according to an operation by a user, and supplies to the controller 10 the received instructions. Specifically, the input unit 12, in accordance with an operation by the user, receives an instruction for designation of the target audio data, and an instruction for causing the start of detection of the utterance audio interval.

The output unit 13 comprises a display 13a and a speaker 13b, and outputs, in accordance with control by the controller 10, in a form recognizable by the user various types of information including detection information corresponding to a result of detection of the utterance audio interval. Specifically, the output unit 13, in accordance with control by the controller 10, displays on the display 13a a detection image representing the result of detection of the utterance audio interval as the detection information, and outputs from the speaker 13b an audio signal included in the detected utterance audio interval as the detection information.

The communicator 14, in accordance with control by the controller 10, performs wireless communication via a communication network such as a local area network (LAN), the Internet, or the like with an external information processing apparatus such as a PC, a smart phone, or the like, and sends and receives data with the external information processing apparatus. Specifically, the communicator 14 receives from the external information processing apparatus such as a PC, a smart phone, or the like, the target audio data generated by the external information processing apparatus, and supplies to the storage 11 the received target audio data.

The power supply unit 15 comprises a power supply such as a storage battery or the like and a power supply control circuit for controlling the power supply, and in accordance with control by the controller 10, supplies electrical power to various components of the audio interval detection apparatus 1.

Figure 2:
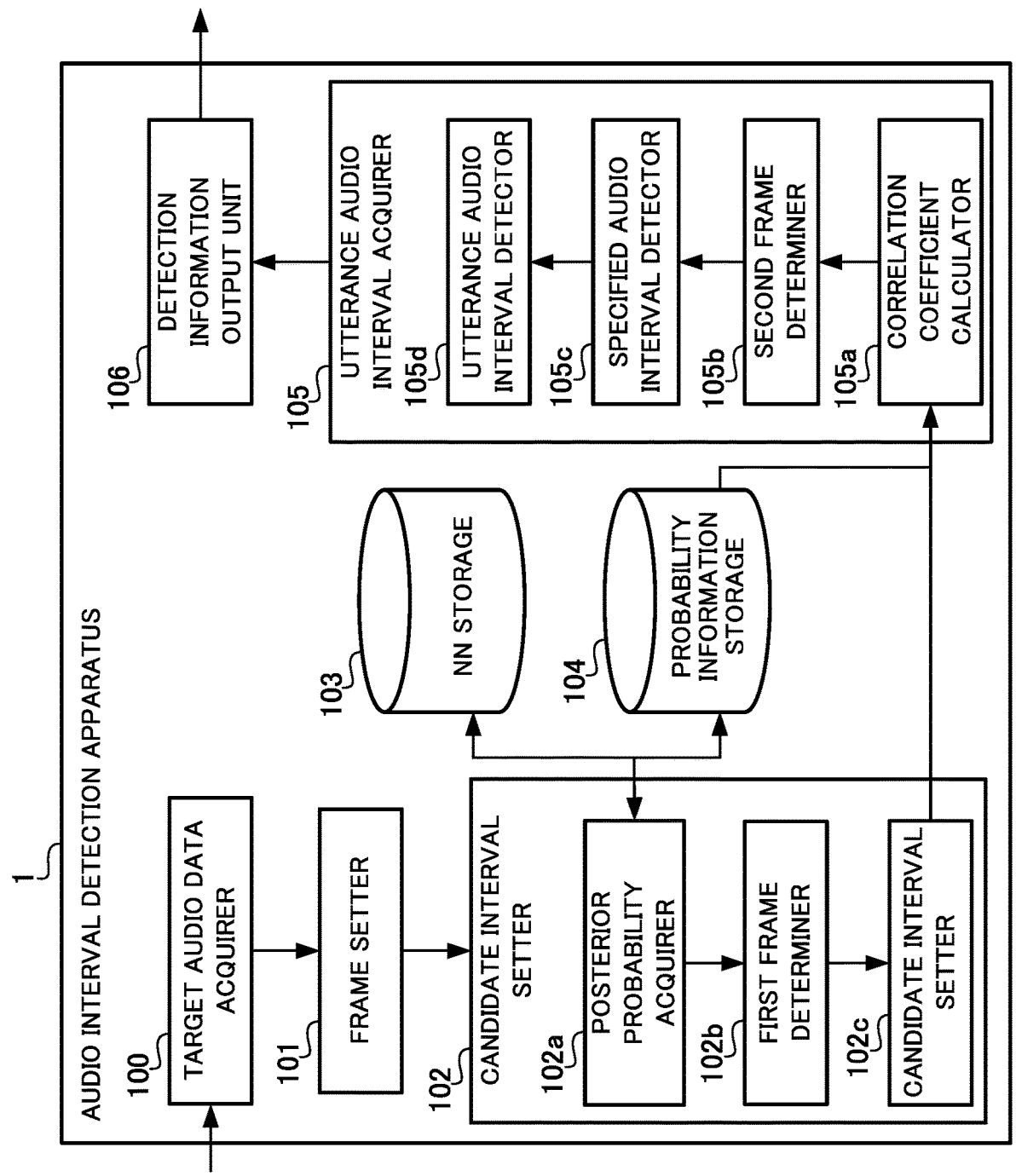
FIG. 2 illustrates functional configuration of the audio interval detection apparatus according to the embodiment of the present disclosure.

As illustrated in FIG. 2, the audio interval detection apparatus 1 comprising the aforementioned physical configuration functionally comprises a target audio data acquirer 100, a frame setter 101, a candidate interval acquirer 102, a NN storage 103, a probability information storage 104, an utterance audio interval acquirer 105, and a detection information output unit 106.

The target audio data acquirer 100, the frame setter 101, the candidate interval acquirer 102, the utterance audio interval acquirer 105, and the detection information output unit 106 are realized by the controller 10. Specifically, the controller 10 executes the control program stored in the storage 11 to control the audio interval detection apparatus 1, thereby functioning as each of these components. The NN storage 103 and the probability information storage 104 are realized by the storage 11. Specifically, the NN storage 103 and the probability information storage 104 are provided in storage regions of the external storage device included in the storage 11.

The target audio data acquirer 100 acquires from the external storage device included in the storage 11 the target audio data stored by the external storage device.

The frame setter 101 sets time-wise sequential multiple frames in the target audio signal represented by the target audio data acquired by the target audio data acquirer 100. A frame is a time window whose time length is a frame length. The frame length is a predetermined time length. Setting of the frames executed by the frame setter 101 is described below with reference to FIG. 3.

Figure 3:
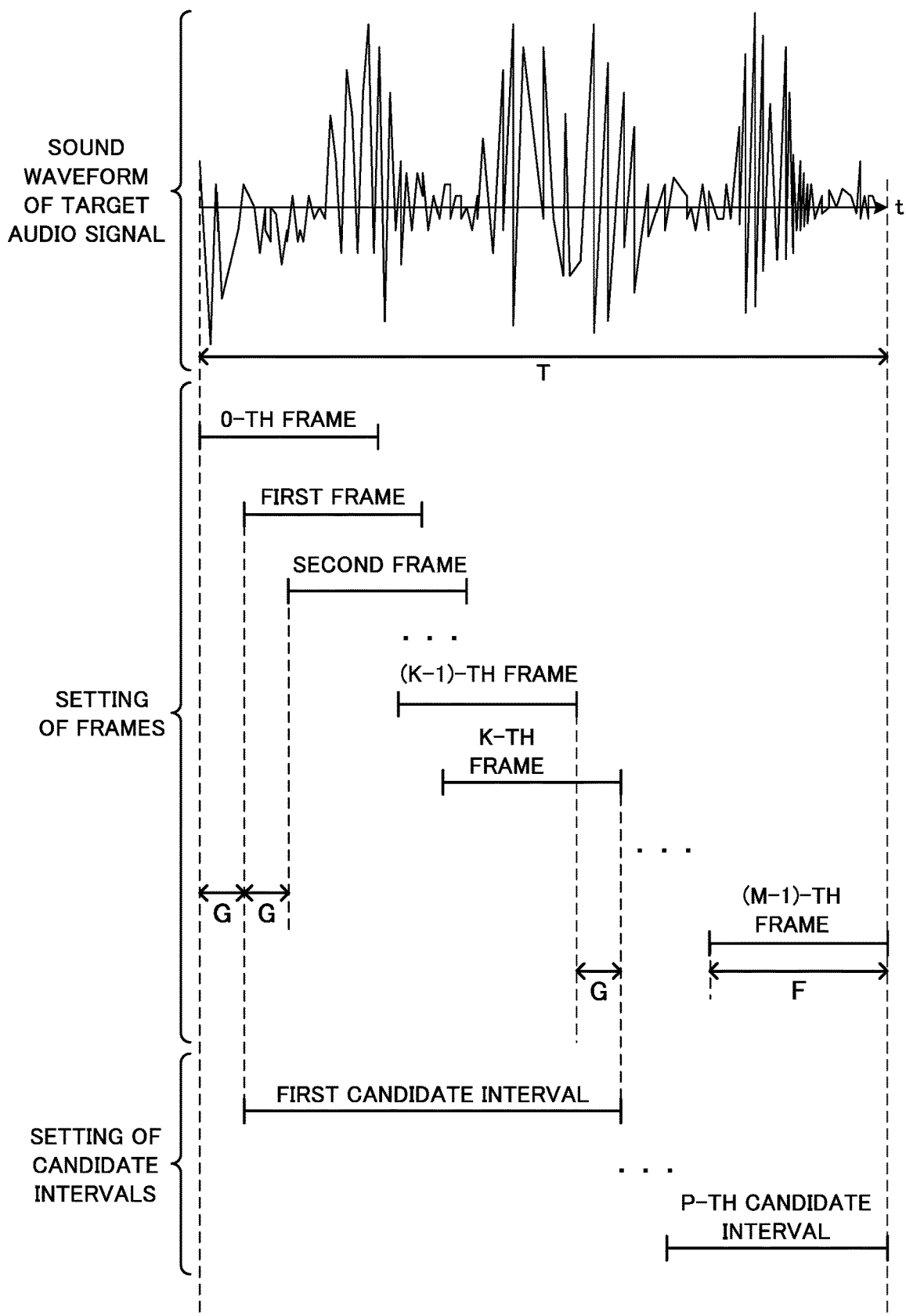
FIG. 3 is a drawing for description of setting of candidate intervals and setting of frames executed by the audio interval detection apparatus according to the embodiment of the present disclosure.

In FIG. 3, a waveform chart is illustrated that represents a sound waveform of the target audio signal. In the waveform chart illustrated in FIG. 3, a vertical axis represents magnitude of the amplitude of the sound waveform, and a horizontal axis represents time t. Hereinafter, as illustrated in FIG. 3, an example is described in which a time length from the start of the target audio signal to the end of the target audio signal is T.

The frame setter 101 sets as a 0th frame, that is an initial frame in the target audio signal, a time window whose time length is a frame length F, and whose start time matches a start of the target audio signal. The initial frame in the target audio signal is the frame having the oldest start time among the frames in the target audio signal. After setting of the 0th frame, the frame setter 101 sets time-wise sequential multiple frames in the target audio signal by repeated execution of (i) determining whether an end time of a time window, whose start time is a time a shift length G after a start time of a target frame, and whose time length is the frame length F, is a time after the end of the target audio signal, and (ii) when the end time is determined to not be a time after the end of the target audio signal, setting the time window as a frame immediately following the target frame, until it is determined that the end time is a time after the end of the target audio signal. When an end time of a time window, whose start time is a time the shift length G after a start time of a target frame, and whose time length is the frame length F, is determined to be a time after the end of the target audio signal, the frame setter 101 ends the processing to set the frames in the target audio signal. The shift length G is a predetermined time length. A frame immediately following a target frame in the target audio signal is a frame that has the newest start time after that of the target frame among the frames within the target audio signal.

Hereinafter, as illustrated in FIG. 3, an example is described in which the frame setter 101 sets M frames of the 0th frame through an (M−1)-th frame in the target audio signal. The 0th frame through the (M−1)-th frame each have a time length that is of the frame length F. As illustrated in FIG. 3, for each frame of a first frame through the (M−1)-th frame, a start time is a time the shift length G after a start time of an immediately prior frame. A frame immediately prior to a target frame in the target audio signal is a frame having the oldest start time after the target frame among the frames within the target audio signal. For example, a start time of the first frame is a time the shift length G after a start time of the 0th frame that is a frame immediately prior to the first frame.

The frame length F and the shift length G are predetermined using an arbitrary method such as experimentation so that the frame length F is set to be longer than the shift length G. In the present embodiment, the frame length F is set to 25 ms, and the shift length G is set to 10 ms. Since the frame length F is set to be longer than the shift length G, each frame overlaps the immediately following frame by a time length (F-G).

Again referring to FIG. 2, the candidate interval acquirer 102 sets a candidate interval in the target audio signal. As described below, the audio interval detection apparatus 1 detects the utterance audio interval from the candidate interval set by the candidate interval acquirer 102. As illustrated in FIG. 2, the candidate interval acquirer 102 comprises a posterior probability acquirer 102a, a first frame determiner 102b, and a candidate interval setter 102c.

The posterior probability acquirer 102a acquires, for each frame set by the frame setter 101, posterior probabilities of the audio signal that is included in the frame representing each state of each phoneme.

A state of a phoneme is a unit of the phoneme divided in the time direction. For each phoneme, a number of states of each phoneme is predetermined. Hereinafter, an example is described in which the number of states of each phoneme is set to three. For example, a phoneme "a" is divided into three states, that is, a first state "a1" including an utterance start time of the phoneme, a third state "a3" including an utterance end time of the phoneme, and a second state "a2" being a state intermediate between the first state "a1" and the third state "a3".

Hereinafter, an example is described in which a mono-phone model is used as the acoustic model. The acoustic model models frequency characteristics of phonemes. The mono-phone model is an acoustic model generated for each single phoneme and is not dependent on neighboring phonemes, that is to say, is an acoustic model that fixes state transitions with the states of the prior and following phonemes. The posterior probability acquirer 102a, for each frame, acquires the posterior probabilities of the audio signal included in the frame representing each of the three states of each of the phonemes in the mono-phone model. In the case in which the number of all phonemes used by the mono-phone model is set to be Q, there exist (3×Q) states. The posterior probability acquirer 102a acquires the posterior probabilities corresponding to each of the (3×Q) states.

In the present embodiment, indexes are uniquely associated with each of the states of each phoneme as identifiers.

Figure 4:
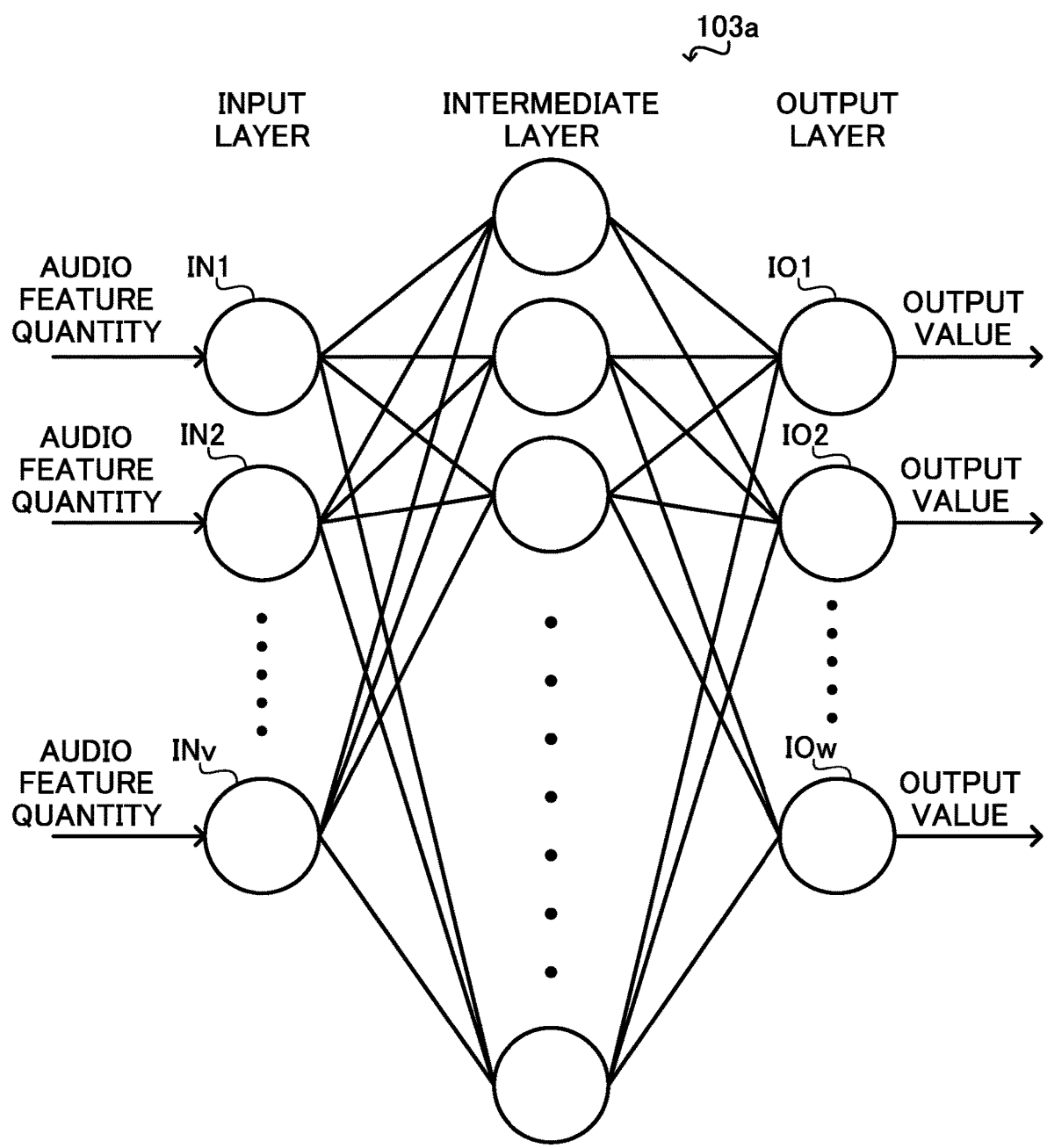
FIG. 4 illustrates an example of configuration of a neural network (NN) according to the embodiment of the present disclosure.

The posterior probability acquirer 102a acquires the posterior probabilities by use of a NN 103a stored in the NN storage 103 illustrated in FIG. 4. The NN 103a outputs the posterior probabilities of an audio signal representing each of the states of each of the phonemes in the mono-phone model. Specifically, units IN1 to INv of an input layer of the NN 103a are respectively associated with each dimension of mel-frequency cepstrum coefficients (MFCC) in advance, and units IO1 to IOw of an output layer of the NN 103a are respectively associated with the each state of each phoneme in the mono-phone model in advance. In response to inputting of the MFCC as audio feature quantities of an audio signal to the input layer, the NN 103a outputs from the output layer posterior probabilities of the audio signal representing each of the states of each phoneme.

The posterior probability acquirer 102a converts an audio signal included in a frame into MFCC, acquires the MFCC as audio feature quantities of the audio signal, inputs values of each dimension of the acquired MFCC in the units IN1 to INv of the input layer of the NN 103a associated with each of the dimensions, and inputs to a softmax function output values output by each of the units IO1 to IOw of the output layer of the NN 103a in response to the inputting of the values of each dimension, thereby acquiring the posterior probabilities of the audio signal representing each of the states of each phoneme in the mono-phone model.

The posterior probability acquirer 102a supplies to the probability information storage 104, and causes storage of, probability information representing the posterior probabilities of the audio signal, that is included in each frame, representing each of the states of each phoneme. Moreover, the posterior probability acquirer 102a supplies the probability information to the first frame determiner 102b.

Again referring to FIG. 2, the first frame determiner 102b, for each frame in the target audio signal, determines whether a predetermined first determination condition is established for the frame. The first determination condition is established in the case in which a sum of the posterior probabilities of the audio signal, that is included in the frame, representing each state of each of the phonemes corresponding to voiced sound is greater that a sum of the posterior probabilities of the audio signal representing each of the states of each of the phonemes corresponding to unvoiced sound. That is to say, the first determination condition is established in the case in which the below listed Formula (1) is established. The first frame determiner 102b determines whether the first determination condition is established by determining whether Formula (1) is established. As mentioned in FUJITA, Yusa and ISO, Ken-ichi, "Robust DNN-based VAD Augmented with Phone Entropy Based Rejection of Background Speech", Spoken Language Processing (SLP), Vol. 2016-SLP-112, No. 9, pp. 1-6 (July, 2016), a probability of the speech utterance signal being included in a frame is high when the first determination condition is established for the frame. However, when the first determination condition is not established for a frame, a probability of the speech utterance signal being included in the frame is low.

$$\sum_{i \in S} p(i \mid x(t_j)) > \sum_{i \in N} p(i \mid x(t_j)) \quad (1)$$

In Formula (1), S represents a set having as elements indexes associated with the states of the phonemes corresponding to voiced sound, among the indexes associated as identifiers with each of the states of each of the phenomes. N represents a set having as elements indexes associated with the states of the phonemes corresponding to unvoiced sound, among the indexes associated as identifiers with each of the states of each of the phenomes. Moreover, $p(i|x(t_j))$ represents a posterior probability that the audio signal having an audio feature quantity $x(t_j)$ represents a state of the phoneme associated with an index i. The audio feature quantity $x(t_j)$ represents an audio feature quantity of an audio signal included in a frame whose start time is the time $t_j$.

The first frame determiner 102b, on the basis of the probability information supplied from the posterior probability acquirer 102a, acquires the posterior probability $p(i|x(t_j))$, and based on the acquired posterior probability $p(i|x(t_j))$, determines whether the Formula (1) is established. The audio feature quantity $x(t_j)$ in Formula (1) is MFCC acquired by the posterior probability acquirer 102a by conversion of an audio signal included in a frame whose start time is the time $t_j$, and the posterior probability $p(i|x(t_j))$ is a posterior probability of the audio signal representing the state of the phoneme associated with the index i which is acquired by the posterior probability acquirer 102a by inputting the MFCC into the NN 103a. The first frame determiner 102b supplies to a candidate interval setter 102c information representing the determination result.

The candidate interval setter 102c sets the candidate intervals within the target audio signal. Specifically, the candidate interval setter 102c sets as the candidate interval an interval within the target audio signal determined by the first frame determiner 102b to have the first determination condition established for all frames included in the interval. Note that, the start and the end of the candidate interval may be set using the method mentioned in OBUCHI, Yasunari, TAKEDA, Ryo, and KANDA, Naoyuki, "Voice Activity Detection under Noisy Environment Based on Augmented Execution Off Statistical Noise Suppression", IEICE Technical Report: Communication Technology, Vol. 2012-SLP-94, No. 18, pp. 101-106, (December, 2012).

As described above, when the first determination condition is established for a frame, the probability that the speech utterance signal is included in the frame is high, and when the first determination conditions is not established for the frame, the probability that the speech utterance signal is included in the frame is low. The frames included in the candidate interval are all determined by the first frame determiner 102b to have the first determination condition established, and thus the probability is high that the speech utterance signal is included in the candidate interval. On the other hand, the probability is low that the speech utterance signal is included in intervals other than the candidate interval in the target audio signal.

Hereinafter, as illustrated in FIG. 3, an example is described in which the candidate interval setter 102c sets P candidate intervals of a first candidate interval through a P-th candidate interval in the target audio signal. The frames included in the first candidate interval through the P-th candidate interval are all frames for which the first determination condition is determined to be established by the first frame determiner 102b in the frame. For example, as illustrated in FIG. 3, the first candidate interval includes K frames of the first frame through the K-th frame, and for all of the first frame through K-th frame, the first frame determiner 102b determines that the first determination condition is established for the frame.

Again with reference to FIG. 2, the NN storage 103 stores data representing the NN 103a. The NN 103a is generated by the external information processing apparatus such as a PC, a smart phone, or the like, by performing machine learning according to an arbitrary method such as error back propagation or the like, using a speech corpus as teacher data. The speech corpus is a set of a large amount of audio data representing audio uttered by multiple speakers. The audio interval detection apparatus 1 receives from the external information processing apparatus via the communicator 14 data representing the NN 103a generated by the external information processing apparatus, and stores the received data in the NN storage 103.

The probability information storage 104 stores the probability information supplied from the posterior probability acquirer 102a. The probability information storage 104 supplies to the utterance audio interval acquirer 105 the stored probability information.

The utterance audio interval acquirer 105 detects the utterance audio interval from the candidate intervals acquired by the candidate interval acquirer 102.

As described above, the probability that the speech utterance signal is included in the candidate interval is high, while the probability that the speech utterance signal is included in intervals other than the candidate interval in the target audio signal is low. By detecting the utterance audio intervals from the candidate intervals, the utterance audio interval acquirer 105 can reduce the burden of processing while suppressing the lowering of detection accuracy in comparison to the case in which the utterance audio intervals are detected from the entire target audio signal.

Although the possibility is high that the speech utterance signal is included in the candidate interval, there is a possibility that an audio signal representing a noise audio generated by a sound source other than the speaker is included in the candidate interval. Specific examples of the noise audio include operational noise of a circulation fan, operational noise of an air conditioner, operational noise of a refrigerator, or the like.

The utterance audio interval acquirer 105 detects as the utterance audio interval an interval other than an interval having a high probability of including the noise audio signal in the candidate interval, and not including the speech utterance signal.

Specifically, the utterance audio interval acquirer 105 detects from the candidate interval a specified audio interval that includes a specified audio signal representing the state of the phoneme of a same consonant produced continuously over a period longer than a predetermined specified time, and detects as the utterance audio interval an interval other than the detected specified audio interval in the candidate interval.

The specified time is predetermined by using an arbitrary method in accordance with an average value of continuance length of each state of the phoneme of each consonant. The continuance length of each state of the phoneme of each consonant is a time length over which each state of the phoneme of each consonant is uttered by the speaker. Specifically, the specified time is set in accordance with the below-listed Formula (2).

$$L = AA + 2 \times SD \tag{2}$$

In Formula (2), L represents the specified time. AA represents an average value of the continuance length of each state of the phoneme of each consonant. SD represents a standard deviation of the continuance length of each state of the phoneme of each consonant. The average value AA of the continuance length of each state of the phoneme of each consonant and the standard deviation SD of the continuance length of each state of the phoneme of each consonant are acquired in accordance with a distribution of continuance lengths of each state of the phoneme of each consonant in the speech corpus.

In a case in which a noise audio signal is included in the candidate interval, the noise audio signal has a high probability of being a phoneme of a consonant and a low probability of being a phoneme of a vowel. Moreover, in a case in which the speaker utters the phoneme of a consonant, the probability is low that the speaker utters the phoneme of the consonant continuously over a period longer than the specified time. Thus the specified speech signal representing a state of the phoneme of the same consonant produced continuously over a period longer than the specified time is highly likely to be the noise audio signal, and the specified audio interval is likely to include the noise audio signal and not to include the speech utterance signal. By detecting as the utterance audio interval an interval other than the specified audio interval in the candidate interval, the utterance audio interval acquirer 105 can reduce a probability of erroneously detecting as the utterance audio interval an interval that includes the noise audio signal without including the speech utterance signal, and improve the detection accuracy of the utterance audio interval.

The utterance audio interval acquirer 105 detects as the utterance audio interval an interval, among intervals other than the specified audio interval in the candidate interval, having a time length that is longer than or equal to a predetermined determination time.

The determination time is predetermined by using an arbitrary method such as experimentation or the like. Specifically, in the present embodiment, the determination time is set to be a time length obtained by multiplying 0.1 times an average value of the continuance length of each phoneme.

The average value of the continuance length of each phoneme is acquired in accordance with a distribution of continuance lengths of each phoneme in the speech corpus.

When the speaker utters a speech utterance, the probability is low that the speaker utters the speech utterance over a period shorter than the determination time. Thus an interval, among the intervals other than that the specified audio interval in the candidate intervals, having a time length shorter than the determination time is unlikely to be the uttered audio interval, and is highly likely to include the noise signal without including the speech utterance signal. By detecting as the utterance audio interval the interval having the time length longer than or equal to the determination time among the intervals other than the specified audio in the candidate intervals, the utterance audio interval acquirer 105 can reduce a probability of erroneously detecting as the utterance audio interval the interval that does not include the speech utterance signal while including the noise audio signal, and improve the detection accuracy of the utterance audio interval.

As illustrated in FIG. 2, the utterance audio interval acquirer 105 comprises a correlation coefficient calculator 105a, a second frame determiner 105b, a specified audio interval detector 105c, and an utterance audio interval detector 105d.

The correlation coefficient calculator 105a calculates, for each frame within each of the candidate intervals, a correlation coefficient representing a degree of correlation between (i) a probability distribution of posterior probabilities of an audio signal, that is included in the frame, representing each state of the phoneme of each consonant and (ii) a probability distribution of posterior probabilities of an audio signal, that is included in a frame immediately prior to the frame, representing each state of the phoneme of each consonant. Specifically, the correlation coefficient calculator 105a calculates the correlation coefficient in accordance with the below-listed Formula (3). Note that, for the initial frame in each candidate interval, no frame exists immediately prior to the initial frame, and thus the initial frame is excluded from the target of the calculation of the correlation coefficient by the correlation coefficient calculator 105a.

$$\rho(t_j) = \frac{\sum_{i \in C} \{p(i \mid x(t_j)) - AV(p(t_j))\}\{p(i \mid x(t_{j-1})) - AV(p(t_{j-1}))\}}{\sqrt{\left[\sum_{i \in C} \{p(i \mid x(t_j)) - AV(p(t_j))\}^2\right]\left[\sum_{i \in C} \{p(i \mid x(t_{j-1})) - AV(p(t_{j-1}))\}^2\right]}} \tag{3}$$

In Formula (3), $\rho(t_j)$ represents a correlation coefficient representing the degree of correlation between (i) a probability distribution of posterior probabilities of an audio signal, that is included in a frame whose start time is the time $t_j$, representing each of the states of the phoneme of each of the consonants, and (ii) a probability distribution of posterior probabilities of an audio signal, that is included in a frame immediately prior to the frame, representing each of the states of the phoneme of each of the consonants. C represents a set having as elements, among indexes associated as identifiers with each of the states of each of the phonemes, indexes associated with the states of the phonemes of consonants. $p(i|x(t_j))$ represents a posterior probability that an audio signal having an audio feature quantity $x(t_j)$ represents a state of the phoneme associated with the index i. The audio feature quantity $x(t_j)$ represents an audio feature quantity of an audio signal included in a frame whose start time is the time $t_j$. $AV(p(t_j))$ represents an arithmetic mean of posterior probabilities of an audio signal, included in a frame whose start time is the time $t_j$, representing each of the states of the phoneme of each consonant. $p(i|x(t_{j-1}))$ represents a posterior probability that an audio signal having an audio feature quantity $x(t_{j-1})$ represents a state of the phoneme associated with the index i. The audio feature quantity $x(t_{j-1})$ represents an audio feature quantity of an audio signal included in a frame whose start time is the time $t_{j-1}$. The time $t_{j-1}$ is a start time of a frame immediately prior to a frame whose start time is $t_j$. That is to say, the frame whose start time is the time $t_{j-1}$ is the frame immediately prior to the frame whose start time is $t_j$. $AV(p(t_{j-1}))$ represents an arithmetic mean of the posterior probabilities of the audio signal, that is included in the frame whose start time is the time $t_{j-1}$, representing each of the states of the phoneme of each of the consonants.

The correlation coefficient calculator 105a acquires from the probability information storage 104 the probability information stored by the probability information storage 104, and on the basis of the acquired probability information, acquires the posterior probability $p(i|x(t_j))$, the posterior probability $p(i|x(t_{j-1}))$, the arithmetic mean $AV(p(t_{j-1}))$, and the arithmetic mean $AV(p(t_j))$, and calculates the correlation coefficients.

Specifically, the audio feature quantity $x(t_j)$ is MFCC acquired by the posterior probability acquirer 102a by converting the audio signal included in the frame whose start time is the time $t_j$; and the posterior probability $p(i|x(t_j))$ is the posterior probability that the audio signal represents the state of the phoneme associated with the index i, that is acquired by the posterior probability acquirer 102a by inputting the MFCC into the NN 103a. Moreover, the audio feature quantity $x(t_{j-1})$ is MFCC acquired by the posterior probability acquirer 102a by converting the audio signal included in the frame whose start time is the time $t_{j-1}$; and the posterior probability $p(i|x(t_{j-1}))$ is the posterior probability that the audio signal represents the state of the phoneme associated with the index i, that is acquired by the posterior probability acquirer 102a by inputting the MFCC into the NN 103a.

The arithmetic mean $AV(p(t_j))$ is acquired by calculating the arithmetic mean of the posterior probabilities of the audio signal representing each state of the phoneme of each of the consonants, that are acquired by the posterior probability acquirer 102a by inputting into the NN 103a the MFCC acquired by conversion of the audio signal included in the frame whose start time is the time $t_j$. The arithmetic mean $AV(p(t_{j-1}))$ is acquired by calculating the arithmetic mean of the posterior probabilities of the audio signal representing each state of the phoneme of each of the consonants, that are acquired by the posterior probability acquirer 102a by inputting into the NN 103a the MFCC acquired by conversion of the audio signal included in the frame whose start time is the time $t_{j-1}$.

The correlation coefficient calculator 105a supplies to the second frame determiner 105b information representing the calculated correlation coefficients.

The second frame determiner 105b determines, for each frame in each candidate interval, on the basis of whether a predetermined second determination condition is established, whether an audio signal is included that is the same as an audio signal representing the state of a phoneme of a consonant included in a frame immediately prior to the frame. The second determination condition is established when the correlation coefficient calculated by the correlation coefficient calculator 105a is greater than or equal to a predetermined determination threshold. The determination threshold is predetermined by using an arbitrary method such as experimentation or the like. In a case in which the second determination condition is established for a target frame, the target frame includes an audio signal that is the same as the audio signal representing the state of the phoneme of the consonant included in a frame immediately prior to the target frame. However, in a case in which the second determination condition is not established for a target frame, the target frame does not include an audio signal that is the same as the audio signal representing the state of the phoneme of the consonant included in a frame immediately prior to the target frame.

Note that, the initial frame in the candidate interval, which is excluded from the target of the calculation of the correlation coefficients by the correlation coefficient calculator 105a, is excluded from the target of determination by the second frame determiner 105b. The second frame determiner 105b supplies the information representing the determination results to the specified audio interval detector 105c.

The specified audio interval detector 105c detects as the specified audio interval an interval within the candidate interval, determined by the second frame determiner 105b to have the second determination condition established for all the frames included in the interval, that includes frames of a number greater than a predetermined specified number. The specified number is predetermined, in accordance with the below-listed Formula (4), according to the specified time.

$$L=F+(Y-1)\times G \qquad (4)$$

In Formula (4), Y represents the specified number. L represents the specified time. F represents the frame length. G represents the shift length. The specified number corresponds to a number of time-wise sequential frames included in an interval whose time length is the specified time. Thus when an interval in the candidate interval, determined by the second frame determiner 105b to have the second determination condition established for all the frames included in the interval, includes frames of a number greater than the specified number, the interval includes the specified audio signal representing the state of the same consonant produced continuously over a period longer than the specified time.

Figure 5:
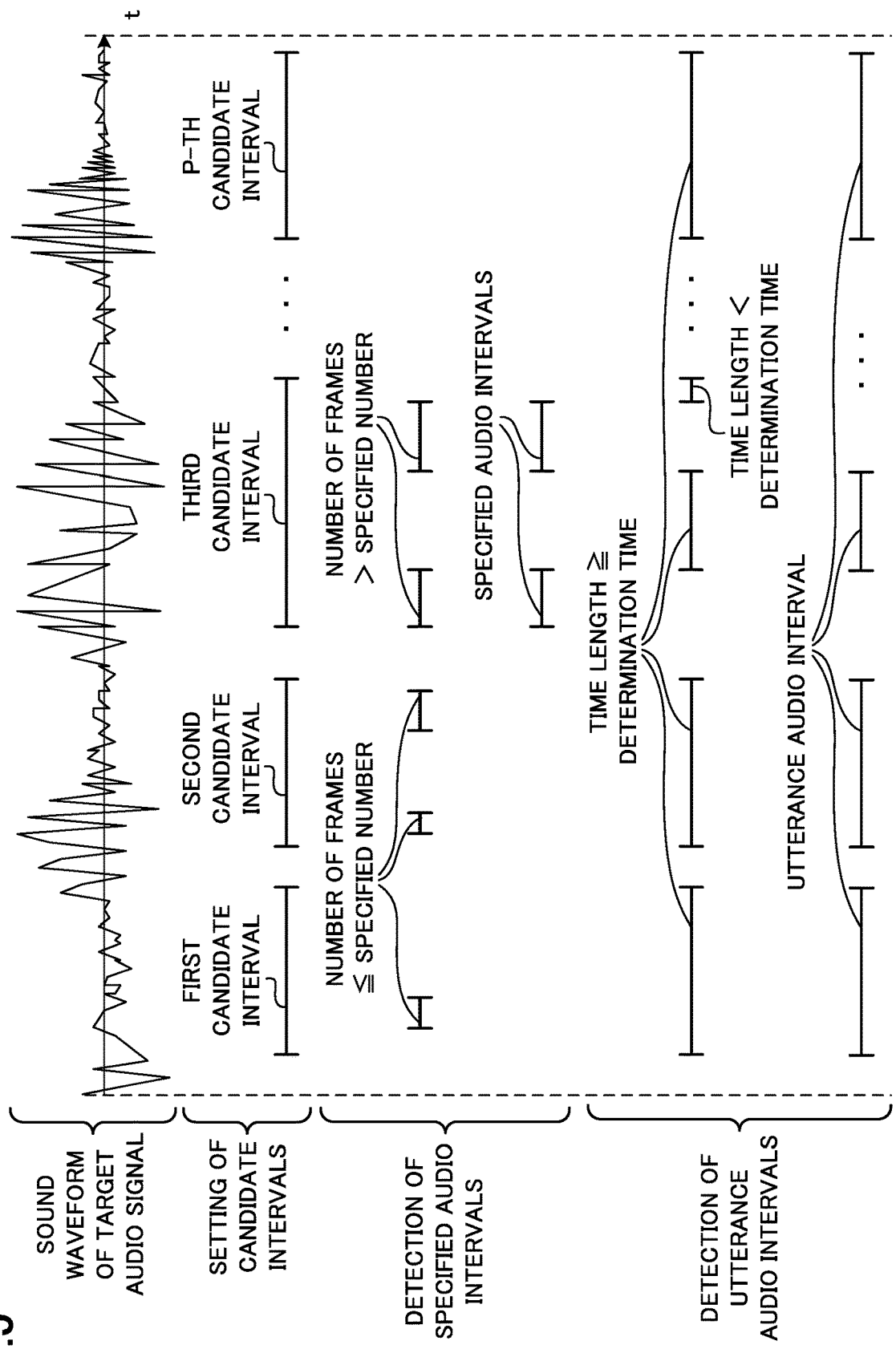
FIG. 5 is drawing for description of detection of utterance audio intervals and detection of specified audio intervals executed by the audio interval detection apparatus according to the embodiment of the present disclosure.

Hereinafter, as illustrated in FIG. 5, an example is described in which a first candidate interval through a P-th candidate interval set by the candidate interval acquirer 102 includes: (i) intervals that include frames, for which the second determination condition is determined to be established, of numbers greater than the specified number, and (ii) intervals that include frames, for which the second determination condition is determined to be established, of numbers less than or equal to the specified number. As illustrated in FIG. 5, the specified audio interval detector 105c detects as the specified audio intervals the intervals that include frames, for which the second determination condition is determined to be established, of numbers greater than the specified number.

Again referring to FIG. 2, the utterance audio interval detector 105d detects as the utterance audio interval an interval other than the specified audio interval detected by the specified audio interval detector 105c in the candidate intervals, having the time length longer than or equal to the determination time.

Hereinafter, as illustrated in FIG. 5, an example is described in which intervals other than the specified audio intervals in the first candidate interval through the P-th candidate interval include (i) intervals having a time length longer than or equal to the determination time, and (ii) intervals having a time length shorter than the determination time. As illustrated in FIG. 5, the utterance audio interval detector 105d detects as the utterance audio intervals the intervals, among these intervals, having a time length longer than or equal to the determination time.

Again referring to FIG. 2, the detection information output unit 106 causes the output unit 13 to output the detection information corresponding to a result of the detection of the utterance audio intervals by the utterance audio interval detector 105d. Specifically, as illustrated in FIG. 6, the detection information output unit 106 causes the display 13a included in the output unit 13 to display, as the detection information, a detection image WW representing the result of the detection of the utterance audio intervals by the utterance audio interval detector 105d, and causes the speaker 13b included in the output unit 13 to output, as the detection information, an audio signal included in the utterance audio interval detected by the utterance audio interval detector 105d.

Figure 6:
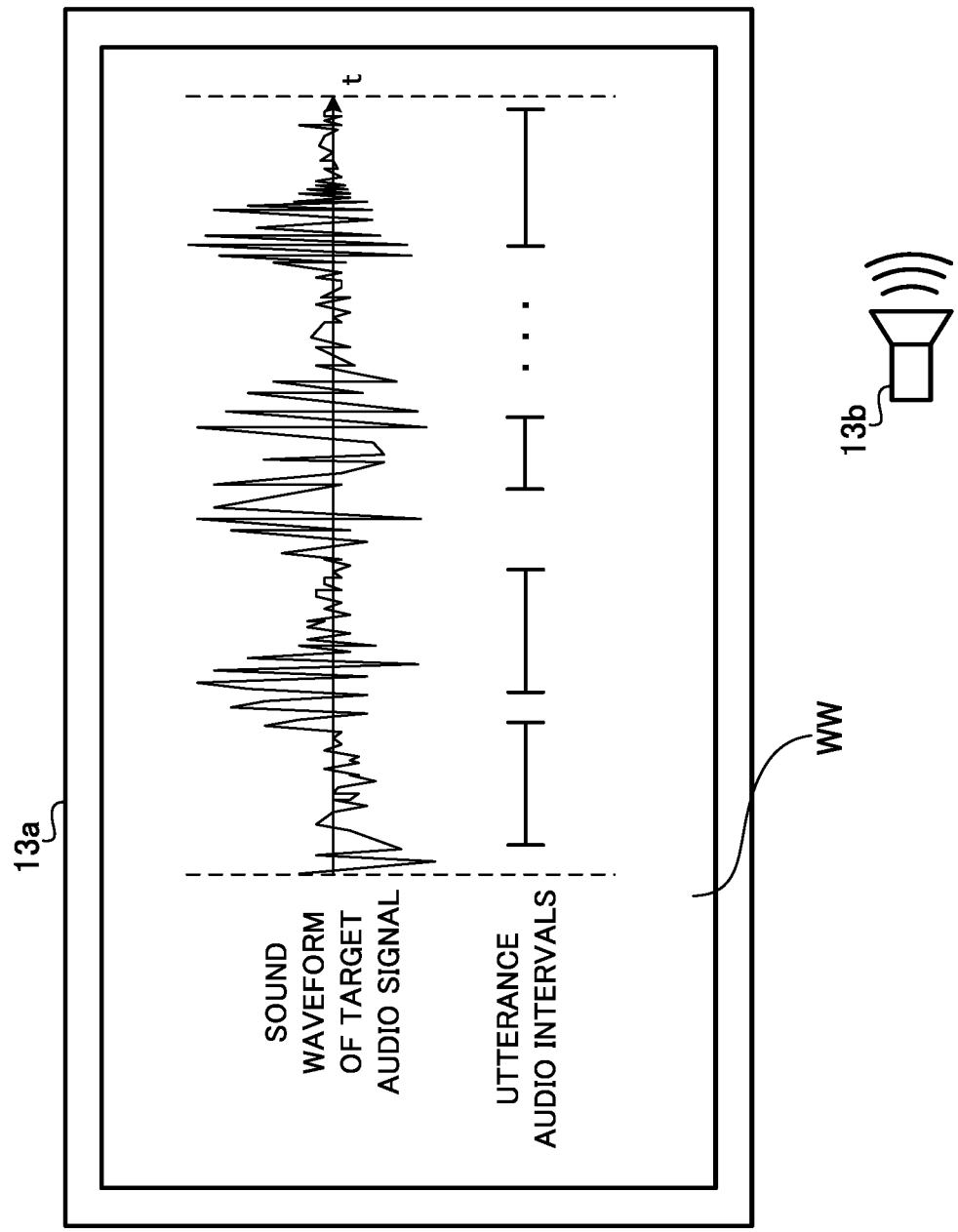
FIG. 6 is a drawing for description of outputting of detection information executed by the audio interval detection apparatus according to the embodiment of the present disclosure.

As illustrated in FIG. 6, the detection image WW includes an image representing a sound waveform of the target audio signal and an image representing the detected utterance audio interval. In the case in which multiple utterance audio intervals are detected by the utterance audio interval detector 105d, the detection information output unit 106 causes the speaker 13b to output successively the audio signals included in each detected utterance audio interval, in chronological order, from the audio signal included in the utterance audio interval whose start time is the oldest to the audio signal included in the utterance audio interval whose start time is the newest.

Note that, in the case in which no utterance audio interval is detected by the utterance audio interval detector 105d, the detection information output unit 106 causes the output unit 13 to output non-detection information notifying that the utterance audio interval is not detected. Specifically, the detection information output unit 106 causes the display 13a to display, as the non-detection information, an image representing a message saying "an utterance audio interval was not detected", and causes the speaker 13b to output, as the non-detection information, an audio signal representing a message saying "an utterance audio interval was not detected".

Figure 8:
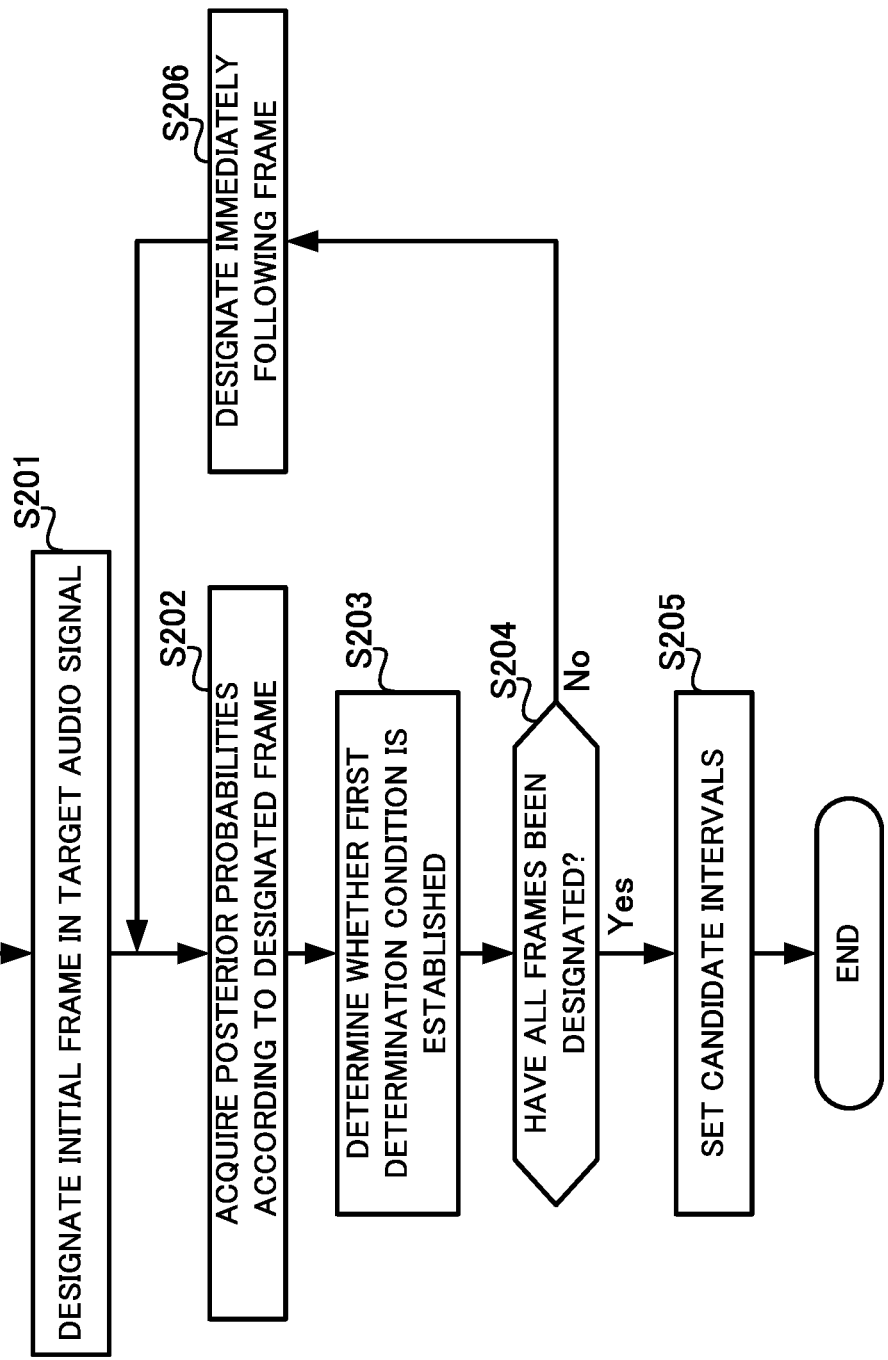
FIG. 8 is a flowchart for description of candidate interval acquisition processing executed by the audio interval detection apparatus according to the embodiment of the present disclosure.
Figure 9:
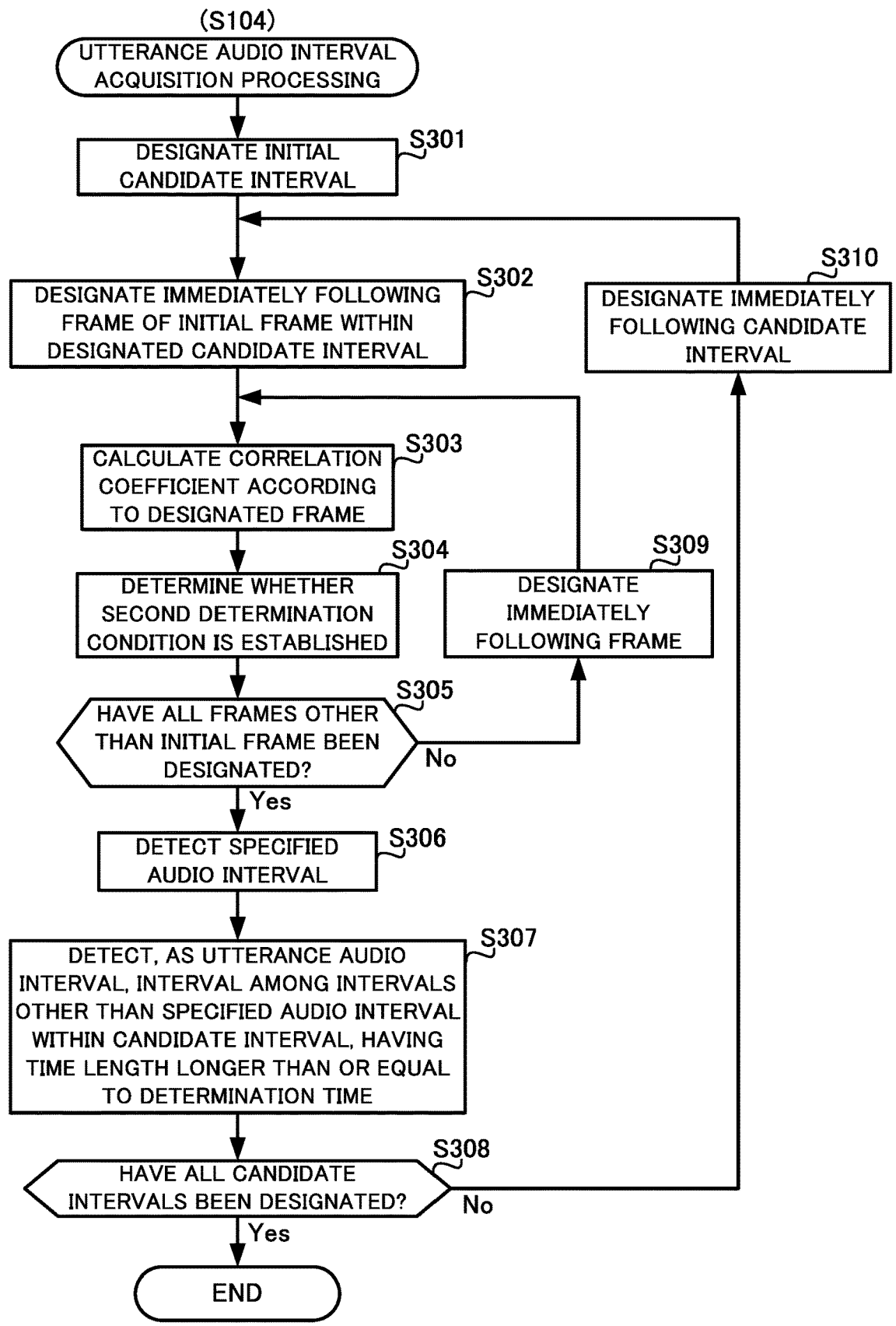
FIG. 9 is a flowchart for description of utterance audio interval acquisition processing executed by the audio interval detection apparatus according to the embodiment of the present disclosure.

Audio interval detection processing executed by the audio interval detection apparatus 1 comprising the aforementioned physical and functional configurations is described below with reference to the flowcharts of FIGS. 7 to 9.

The audio interval detection apparatus 1 receives, through the communicator 14, from an external information processing apparatus such as a PC, a smart phone, or the like, target audio data generated by the external information processing apparatus, and stores the target audio data in the storage 11 in advance.

Figure 7:
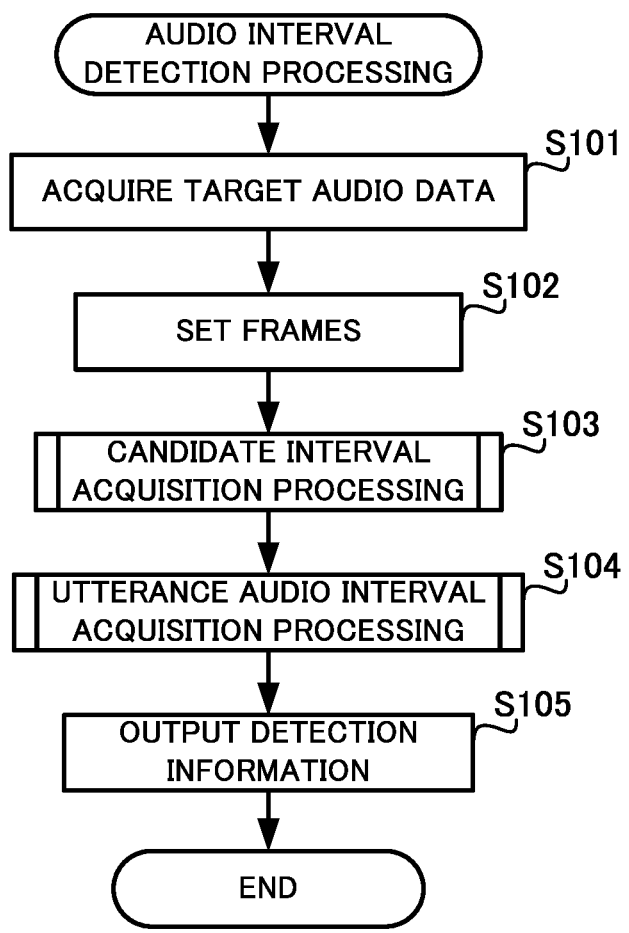
FIG. 7 is a flowchart for description of audio interval detection processing executed by the audio interval detection apparatus according to the embodiment of the present disclosure.

In this state, when the user by operation of the input unit 12 inputs an instruction for the start of detection of the utterance audio interval, the controller 10 starts the audio interval detection processing illustrated in the flowchart of FIG. 7.

Upon the start of the audio interval detection processing, firstly the target audio data acquirer 100 acquires the target audio data stored in the storage 11 (step S101). The frame setter 101 sets the time-wise sequential multiple frames within the target audio signal represented by the target audio data acquired in step S101 (step S102). Specifically, in step S102, after setting as the 0-th frame, that is the initial frame in the target audio signal, a time window whose time length is the frame length F, and whose start time matches the start of the target audio signal, the frame setter 101 sets time-wise sequential multiple frames in the target audio signal by repeated execution of (i) determining whether an end time of a time window, whose start time is a time the shift length G after the start time of a target frame, and whose time length is the frame length F, is a time after the end of the target audio signal, and (ii) upon determination that the end time is not a time after the end of the target audio signal, setting the time window as a frame immediately following the target frame, until it is determined that the end time is a time after the end of the target audio signal.

After the execution of the processing of step S102, the candidate interval acquirer 102 executes candidate interval acquisition processing (step S103). The candidate interval acquisition processing of step S103 is described below with reference to the flowchart of FIG. 8.

Upon the start of the candidate interval acquisition processing, firstly the candidate interval acquirer 102 designates as a processing target frame an initial frame in the target audio signal represented by the target audio data acquired in step S101 (step S201).

After execution of the processing of step S201, the posterior probability acquirer 102a acquires posterior probabilities of the audio signal, that is included in the designated processing target frame, representing each state of each phoneme (step S202). Specifically, the posterior probability acquirer 102a converts the audio signal included in the processing target frame to MFCC, inputs the MFCC into the input layer of the NN 103a stored by the NN storage 103, and inputs into the softmax function output values output by each unit IO1 to IOw of the output layer of the NN 103a in response to the input, thereby acquiring the posterior probabilities of the audio signal, that is included in the processing target frame, representing each state of each phoneme. The posterior probability acquirer 102a causes the probability information representing the acquired posterior probabilities to be stored in the probability information storage 104.

The first frame determiner 102b determines whether the first determination condition is established for the designated processing target frame by determining whether the aforementioned Formula (1) is established on the basis of the posterior probabilities acquired in step S202 (step S203).

After execution of the processing of step S203, the candidate interval acquirer 102 determines whether all the frames in the target audio signal represented by the target audio data acquired in step S101 have been designated as the processing target frame (step S204). Upon determination that there is a frame, among the frames in the target audio signal, that has not yet been designated as the processing target frame (NO in step S204), the candidate interval acquirer 102 designates as the processing target frame a frame immediately following the frame presently being designated as the processing target frame from among the frames in the target audio signal (step S206), and processing returns to step S202.

By repeating the processing of steps S202 to S204 while changing the frame that is designated as the processing target frame, until the determination is YES in step S204, the candidate interval acquirer 102 acquires, for each frame within the target audio signal, posterior probabilities of the audio signal, that is included in the frame, representing each of the states of each phoneme, and determines whether the first determination condition is established for the frame.

Upon determination in step S204 that all the frames within the target audio signal have been designated as the processing target frame (YES in step S204), the candidate interval setter 102c sets as the candidate interval an interval within the target audio signal determined in step S203 to have the first determination condition established for all the frames included in the interval (step S205), and then ends the candidate interval acquisition processing. Note that, in the case in which no interval exists that is an interval within the target audio signal and determined to have the first determination condition established for all frames included in the interval, then the candidate interval setter 102c determines that the utterance audio interval is not detected, and ends the audio interval detection processing.

Again referring to FIG. 7, after the execution of the candidate interval acquisition processing in step S103, the utterance audio interval acquirer 105 executes utterance audio interval acquisition processing (step S104). The utterance audio interval acquisition processing of step S104 is described below with reference to the flowchart of FIG. 9.

Upon the start of the utterance audio interval acquisition processing, firstly the utterance audio interval acquirer 105 designates as a processing target candidate interval the initial candidate interval among the candidate intervals set within the target audio signal in step S205 (step S301). The initial candidate interval among the candidate intervals within the target audio signal is a candidate interval having the oldest start time among the candidate intervals within the target audio signal. After execution of the processing of step S301, the utterance audio interval acquirer 105 designates as a processing target frame a frame immediately following the initial frame among the frames within the designated processing target candidate interval (step S302).

After execution of the processing of step S302, the correlation coefficient calculator 105a calculates in accordance with the aforementioned Formula (3) the correlation coefficients representing the degree of correlation between (i) the probability distribution of the posterior probabilities of the audio signal, that is included in the designated processing target frame, representing each state of the phoneme of each consonant, and (ii) the probability distribution of the posterior probabilities of the audio signal, that is included in the frame immediately prior to the processing target frame, representing each state of the phoneme of each consonant (step S303).

After execution of the processing of step S303, the second frame determiner 105b determines, on the basis of whether the correlation coefficient calculated in step S303 is greater than or equal to the determination threshold, whether the second determination condition is established for the designated processing target frame (step S304).

After execution of the processing of step S304, the utterance audio interval acquirer 105 determines whether, among the frames within the designated processing target candidate interval, all frames other than the initial frame within the designated processing target candidate interval have been designated as the processing target frame (step S305). Upon determination that there is a frame, among the frames within the processing target candidate interval, that has not yet been designated as the processing target frame other than the initial frame within the processing target candidate interval (NO in step S305), the utterance audio interval acquirer 105 designates as the processing target frame a frame immediately following the frame presently designated as the processing target frame among the frames within the processing target candidate interval (step S309), and processing returns to step S303.

By repeating the processing of steps S303 to S305, while changing the frame that is designated as the processing target frame, until the determination is YES in step S305, the utterance audio interval acquirer 105 calculates, for each of the frames other than the initial frame within the designated processing target candidate interval, the correlation coefficients according to the frame, and determines whether the second determination condition is established for the frame.

Upon determination in step S305 that all frames other than the initial frame within the processing target candidate interval among the frames within the designated processing target candidate interval have been designated as the processing target frame (YES in step S305), the specified audio interval detector 105c detects, as the specified audio interval, an interval within the processing target candidate interval, determined in step S304 to have the second determination condition established for all frames included in the interval, that includes frames of a number greater than the specified number (step S306).

After execution of the processing of step S306, the utterance audio interval detector 105d detects as the utterance audio interval, an interval, among intervals other than the specified audio interval detected in step S306 within the designated processing target candidate interval, having the time length longer than or equal to the determination time (step S307).

After execution of the processing of step S307, the utterance audio interval acquirer 105 determines whether all the candidate intervals, among the candidate intervals designated in step S205, have been designated as the processing target candidate interval (step S308). Upon determination that there is a candidate interval, among the candidate intervals designated in step S205, that has not yet been designated as the processing target candidate interval (NO in step S308), the utterance audio interval acquirer 105 designates as the processing target candidate interval a candidate interval immediately following the candidate interval presently designated as the processing target candidate interval among the candidate intervals designated in step S205 (step S310), and processing returns to step S302. A candidate interval immediately following a target candidate interval is a candidate interval that has the newest start time after that of the target candidate interval.

By repeating the processing of steps S302 to S308, while changing the candidate interval that is designated as the processing target candidate interval, until the determination is YES in step S308, the utterance audio interval acquirer 105 detects, for each candidate interval set in step S205, the utterance audio interval that is included in the candidate interval.

Upon determination in step S308 that all the candidate intervals designated in step S205 have been designated as the processing target candidate interval (YES in step S308), the utterance audio interval acquirer 105 ends the utterance audio interval acquisition processing.

Again referring to FIG. 7, after execution of the utterance audio interval acquisition processing in step S104, the detection information output unit 106 causes the output unit 13 to output the detection information corresponding to a result of the detection of the utterance audio interval in step S104 (step S105), and ends the audio interval detection processing. Specifically, in step S105, the detection information output unit 106 causes the display 13a included in the output unit 13 to display, as the detection information, the detection image WW representing the result of the detection of the utterance audio interval in step S104, and causes the speaker 13b included in the output unit 13 to output, as the detection information, an audio signal included in the utterance audio interval detected in step S104. Note that, in the case in which the utterance audio interval is not detected in step S104, the detection information output unit 106 causes the output unit 13 to output the non-detection information.

As described above, the speech detection apparatus 1 detects, from the candidate intervals within the target audio signal, the specified audio intervals including the specified audio signal representing the state of the phoneme of the same consonant produced continuously over a period longer than the specified time, and detects as the utterance audio intervals the intervals other than the specified audio intervals detected among the candidate intervals. In this manner, the probability is reduced that an interval that includes the noise audio signal while not including the speech utterance signal is erroneously detected as the utterance audio interval, and detection accuracy of the utterance audio interval can be improved.

Moreover, the audio interval detection apparatus 1 detects as the utterance audio intervals an interval, among intervals other than the specified audio interval within the candidate intervals, having the time length longer than or equal to the determination time. In this manner, the probability is reduced that an interval that includes the noise audio signal while not including the speech utterance signal is erroneously detected as the utterance audio interval, and detection accuracy of the utterance audio interval can be improved.

Although an embodiment of the present disclosure is described above, the above embodiment is one example and does not limit the applicable scope of the present disclosure. That is to say, various types of applications are possible for embodiments of the present disclosure, and all such embodiments are included in the scope of the present disclosure.

For example, in the above embodiment, the target audio data acquirer 100 is described to acquire from the storage 11 the target audio data stored in the storage 11 in advance. However, this configuration is merely an example, and the target audio data acquirer 100 may acquire the target audio data by an arbitrary method. For example, the audio interval detection apparatus 1 may be configured to comprise a microphone, and the target audio data acquirer 100 may cause the microphone to generate the target audio data by recording the target audio signal, and acquire the generated target audio data from the microphone.

Moreover, in the above embodiment, the posterior probability acquirer 102a is described to acquire the posterior probabilities by use of the NN 103a stored by the NN storage 103. However, this configuration is merely an example, and the posterior probability acquirer 102a may acquire the posterior probability by an arbitrary method. For example, the posterior probability acquirer 102a may acquire the posterior probabilities by use of a hidden Markov model (HMM). The HMM is a model for estimating stochastically, on the basis of an audio signal, the state of the phonemes which caused outputting of the audio signal. HMM uses a standard pattern having, as parameters, a transition probability representing time-wise state fluctuation and a posterior probability of output of input audio feature quantity from each state. When an audio feature quantity of an audio signal included in a frame is input, the HMM outputs, in mixed Gaussian distribution format produced by weighted summation of multiple Gaussian distributions, a probability distribution of posterior probabilities that the audio feature quantity is output from each state of each phoneme.

Moreover, in the above embodiment, a mono-phone model is described to be used as the acoustic model. However, this configuration is merely an example, and an arbitrary acoustic model may be used. For example, a bi-phone model may be used as the acoustic model. The bi-phone model is an acoustic model generated for every two phonemes, and is an acoustic model that depends on adjacent phonemes. The bi-phone model is an acoustic model that takes into consideration a state transition relative to the state of either the prior phoneme or the following phoneme. Alternatively, a tri-phone model may be used as the acoustic model. The tri-phone model is an acoustic model that is generated for each three phonemes, and depends on adjacent phonemes. The tri-phone model takes into consideration state transitions relative to the states of both of the prior phoneme and the following phoneme.

Moreover, in the above embodiment, the posterior probability acquirer 102a is described to acquire, for each of the frames, the posterior probabilities that the audio signal, that is included in the frame, represents each of the three states of each phoneme in the mono-phone. However, this configuration is merely an example, and the posterior probability acquirer 102a may acquire the posterior probabilities of the audio signal, included in each of the frames, represent each of the three states of each phoneme in the bi-phone model. Note that, in this case, each of the units IO1 to IOw of the output layer of the NN 103a may be respectively associated with each of the states of each phoneme in the bi-phone model. Alternatively, the posterior probability acquirer 102a may acquire the posterior probabilities of the audio signal, included in each of the frames, represent each of the three states of each phoneme in the tri-phone model. Note that, in this case, each of the units IO1 to IOw of the output layer of the NN 103a may be associated with each of the states of each phoneme in the tri-phone model. Alternatively, the posterior probability acquirer 102a may acquire the posterior probabilities of the audio signal, included in each of the frames, represent each phoneme. Note that, in this case, each of the units IO1 to IOw of the output layer of the NN 103a may be associated with a respective phoneme.

Moreover, in the above embodiment, the specified time is described to be set in accordance with the aforementioned Formula (2). However, this configuration is merely an example, and the specified time may be set by an arbitrary method in accordance with an average value of the continuance length of each of the states of the phoneme of each of the consonants. For example, the specified time may be set to a time length that is twice the average value of the continuance length of each of the states of the phoneme of each consonant.

Moreover, in the above embodiment, the correlation coefficient calculator 105a is described to calculate, for each frame within the candidate interval, in accordance with the aforementioned Formula (3), the correlation coefficients representing the degree of correlation between (i) the probability distribution of the posterior probabilities of the audio signal, that is included in the target frame, representing each state of the phoneme of each consonant, and (ii) the probability distribution of the posterior probabilities of the audio signal, that is included in the frame immediately prior to the target frame, representing each state of the phoneme of each consonant. However, this configuration is merely an example, and the correlation coefficient calculator 105a may calculate the correlation coefficients by an arbitrary method.

Moreover, in the above embodiment, the detection information output unit 106 is described to cause the display 13a to display as the detection information the detection image WW, and cause the speaker 13b to output as the detection information the audio signal included in the detected utterance audio interval. However, this configuration is merely an example, and the detection information output unit 106 can output the detection information by an arbitrary method. For example, the audio interval detection apparatus 1 may be configured to comprise a printing device that prints a print image on a printing medium such as paper, plastic, or the like, and the detection information output unit 106 may output the detection information by causing the printing device to print, as the detection information, on the printing medium, the print image representing the result of detection of the utterance audio interval by the utterance audio interval detector 105d. Specific examples of the print image representing the result of detection of the utterance audio interval by the utterance audio interval detector 105d include a print image that include an image representing the sound waveform of the target audio signal and an image representing the detected utterance audio interval.

Moreover, in the above embodiment, the audio interval detection apparatus 1 is described to output, after executing the detection of the utterance audio interval, the detection information corresponding to the result of the detection. However, this configuration is merely an example, and the audio interval detection apparatus 1 may execute, after executing the detection of the utterance audio interval, arbitrary processing in accordance with the result of the detection. For example, the audio interval detection apparatus 1 may execute, after executing the detection of the utterance audio interval, voice recognition targeting the audio signal included in the detected utterance audio interval. Alternatively, the audio interval detection apparatus 1 may execute, after executing the detection of the utterance audio interval, emotion recognition for recognizing emotions of the speaker targeting the audio signal included in the detected utterance audio interval.

Note that, while it is needless to say that an information processing apparatus that is preconfigured to realize the functions of the present disclosure can be provided as the audio interval detection apparatus according to the present disclosure, an existing information processing apparatus, such as a PC, a smart phone, or the like, can be caused to function as the audio interval detection apparatus according to the present disclosure by applying a program to the existing information processing apparatus. That is to say, an existing information processing apparatus can be caused to function as the audio interval detection apparatus according to the present disclosure by applying a program for realizing each functional component of the audio interval detection apparatus of the present disclosure in such a way that the program can be executed by a computer controlling the existing information processing apparatus.

Note that, such a program can be applied by using arbitrary method. For example, the program may be applied by storing in a non-transitory computer-readable recording medium such as a flexible disc, a compact disc (CD)-ROM, a digital versatile disc (DVD)-ROM, a memory card, or the like. Further, the program may be superimposed on a carrier wave and be applied via a communication network such as the Internet. For example, the program may be posted to a bulletin board system (BBS) on a communication network and be distributed. Further, a configuration may be realized such that the aforementioned processing can be executed by starting and executing the program under control of an operating system (OS) in the same manner as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An audio interval detection apparatus comprising:
a processor; and
a storage storing instructions that, when executed by the processor, control the processor to:
detect from a target audio signal a specified audio interval including a specified audio signal representing a same state of a phoneme of a consonant produced continuously over a period longer than a specified time, the specified audio interval being detected as an audio interval that does not represent a speech utterance uttered by a speaker, and where the state is a unit of the phoneme divided over time, the phoneme including a predetermined number of states greater than one, and
eliminate at least the detected specified audio interval from the target audio signal and detect, from the target audio signal from which the detected specified audio interval has been eliminated, an utterance audio interval that includes a speech utterance signal representing a speech utterance uttered by a speaker.

2. The audio interval detection apparatus according to claim 1, wherein the instructions, when executed by the processor, further control the processor to:
in the detection of the specified audio interval, detect, from a candidate interval within the target audio signal, the specified audio interval, and
in the detection of the utterance audio interval, detect from the candidate interval an interval other than the detected specified audio interval as the utterance audio interval.

3. The audio interval detection apparatus according to claim 2, wherein the instructions, when executed by the processor, further control the processor to:
in the detection of the utterance audio interval, detect from the candidate interval an interval other than the detected specified audio interval, having a time length longer than or equal to a determination time as the utterance audio interval.

4. The audio interval detection apparatus according to claim 1, wherein the instructions, when executed by the processor, further control the processor to:
determine whether, for each of time-wise sequential multiple frames within the target audio signal, a same audio signal as an audio signal representing a state of a phoneme of a consonant is included in a frame immediately prior to a current target frame among the frames based on whether a correlation coefficient representing a degree of correlation between (i) a probability distribution of posterior probabilities of an audio signal that is included in the current target frame and that represents each state of each phoneme of each of consonants and (ii) a probability distribution of posterior probabilities of an audio signal that is included in the immediately prior frame and that represents each state of each phoneme of each of the consonants, is greater than or equal to a threshold, and in the detection of the specified audio interval, detect as the specified audio interval an interval, within the target audio signal, for which (i) a number of frames in the interval is greater than a specified number, and (ii) for each of the frames included in the interval, an audio signal is determined to be included that is the same as an audio signal representing a state of a phoneme of a consonant included in the immediately prior frame.

5. The audio interval detection apparatus according to claim 1, wherein the specified time is a period corresponding to an average value of a time length over which each state of each phoneme of each consonant is uttered by speakers.

6. The audio interval detection apparatus according to claim 1, wherein an output device outputs detection information corresponding to a result of the detection of the utterance audio interval.

7. A method executed by an audio interval detection apparatus, the audio interval detection apparatus comprising: a processor; and a storage storing instructions executed by the processor, wherein the method comprises:
   detecting, by the processor, from a target audio signal a specified audio interval including a specified audio signal representing a same state of a phoneme of a consonant produced continuously over a period longer than a specified time, the specified audio interval being detected as an audio interval that does not represent a speech utterance uttered by a speaker, and where the state is a unit of the phoneme divided over time, the phoneme including a predetermined number of states greater than one; and
   eliminating, by the processor, at least the detected specified audio interval from the target audio signal and detecting, by the processor, from the target audio signal from which the detected specified audio interval has been eliminated, an utterance audio interval that includes a speech utterance signal representing a speech utterance uttered by a speaker.

8. The method according to claim 7, wherein
   in the detection of the specified audio interval, the specified audio interval is detected from a candidate interval within the target audio signal, and
   in the detection of the utterance audio interval, an interval other than the detected specified audio interval is detected as the utterance audio interval from the candidate interval.

9. The method according to claim 8, wherein
   in the detection of the utterance audio interval, an interval other than the detected specified audio interval, having a time length longer than or equal to a determination time, is detected as the utterance audio interval from the candidate interval.

10. The method according to claim 7, further comprising:
   determining whether, for each of time-wise sequential multiple frames within the target audio signal, a same audio signal as an audio signal representing a state of a phoneme of a consonant is included in a frame immediately prior to a current target frame among the frames based on whether a correlation coefficient representing a degree of correlation between (i) a probability distribution of posterior probabilities of an audio signal that is included in the current target frame and that represents each state of each phoneme of each of consonants and (ii) a probability distribution of posterior probabilities of an audio signal that is included in the immediately prior frame and that represents each state of each phoneme of each of the consonants, is greater than or equal to a threshold, and
   wherein in the detection of the specified audio interval, an interval, within the target audio signal, for which (i) a number of frames in the interval is greater than a specified number, and (ii) for each of the frames included in the interval, an audio signal is determined to be included that is the same as an audio signal representing a state of a phoneme of a consonant included in the immediately prior frame, is detected as the specific audio interval.

11. The method according to claim 7, wherein the specified time is a period corresponding to an average value of a time length over which each state of each phoneme of each consonant is uttered by speakers.

12. The method according to claim 7, wherein an output device outputs detection information corresponding to a result of the detection of the utterance audio interval.

13. A non-transitory recording medium having a program recorded thereon that is executable by a processor of an audio interval detection apparatus to control the processor to:
   detect from a target audio signal a specified audio interval including a specified audio signal representing a same state of a phoneme of a consonant produced continuously over a period longer than a specified time, the specified audio interval being detected as an audio interval that does not represent a speech utterance uttered by a speaker, and where the state is a unit of the phoneme divided over time, the phoneme including a predetermined number of states greater than one; and
   eliminate at least the detected specified audio interval from the target audio signal and detect, from the target audio signal from which the detected specified audio interval has been eliminated, an utterance audio interval that includes a speech utterance signal representing a speech utterance uttered by a speaker.

14. The recording medium according to claim 13, wherein the program causes the processor to:
   in the detection of the specified audio interval, detect from a candidate interval within the target audio signal the specified audio interval, and
   in the detection of the utterance audio interval, detect from the candidate interval an interval other than the detected specified audio interval as the utterance audio interval.

15. The recording medium according to claim 14, wherein the program causes the processor to:
   in the detection of the utterance audio interval, detect from the candidate interval an interval other than the detected specified audio interval, having a time length longer than or equal to a determination time as the utterance audio interval.

16. The recording medium according to claim 13, wherein the program causes the processor to:
   determine whether, for each of time-wise sequential multiple frames within the target audio signal, a same audio signal as an audio signal representing a state of a phoneme of a consonant is included in a frame immediately prior to a current target frame among the frames based on whether a correlation coefficient representing a degree of correlation between (i) a probability distribution of posterior probabilities of an audio signal that is included in the current target frame and that represents each state of each phoneme of each of consonants and (ii) a probability distribution of posterior probabilities of an audio signal that is included in the immediately prior frame and that represents each state of each phoneme of each of the consonants, is greater than or equal to a threshold, and in the detection of the specified audio interval, detect as the specified audio interval an interval, within the target audio signal, for which (i) a number of frames in the interval is greater than a specified number, and (ii) for each of the frames included in the interval, an audio signal is determined to be included that is the same as an audio signal representing a state of a phoneme of a consonant included in the immediately prior frame.

17. The recording medium according to claim 13, wherein the specified time is a period corresponding to an average value of a time length over which each state of each phoneme of each consonant is uttered by speakers.

18. The recording medium according to claim 13, wherein an output device outputs detection information corresponding to a result of the detection of the utterance audio interval.

* * * * *